Patented Nov. 26, 1935

2,022,405

UNITED STATES PATENT OFFICE 2,022,405

WATERPROOFING COMPOSITION

John B. Cleaveland, Short Hills, N. Y.

No Drawing. Application January 22, 1934,
Serial No. 707,784

2 Claims. (Cl. 134—26)

This invention relates to a new waterproofing composition intended particularly for the waterproofing and stainproofing of garments and fabrics which will preserve the fabric and largely eliminate or minimize laundry and dry cleaning problems.

The new composition is made of paraffin wax, a resin such as paracoumarin resin; beeswax, and aluminum palmitate suitably compounded and blended together, and dissolved in xylol and carbon tetrachloride as a solvent. The invention also includes the method of preparing such a composition in which the paraffin wax, resin, beeswax and aluminum palmitate are combined together before forming the solution thereof in the solvent.

The paraffin wax employed should be a refined paraffin wax which, for best results, should have a specific gravity of about 0.890 and a melting point of about 40° C. The paracoumarin resin is advantageously a resin of the hardest grade and water-white in color.

The production of the new composition will be illustrated by the following example, the parts being by weight:

In a tin lined container, four parts of refined paraffin wax are heated with two parts of paracoumarin resin for about thirty minutes at a temperature of about 120° C. with continuous but slow agitation. After these materials have united so as to form a hard, brilliant, waterproof resinous product (as shown when a drop of the melted material is cooled under water) one part of white beeswax is added to the mixture, with continued agitation, and the temperature is gradually lowered to about 80° C. and held at that temperature for about five minutes. There is then added four parts of aluminum palmitate, with continued agitation, and the mixture is allowed to cool gradually with thorough agitation, and avoiding too rapid cooling. When the temperature of the mixture has been lowered to about 50° C., the solvent is added, xylol being added slowly first and with raising of the temperature to about 70° C. until a homogeneous liquid is obtained. This solution is then allowed to cool to room temperature and the carbon tetrachloride is added. The resulting solution is then filtered and allowed to stand in glass lined containers.

The composite solvent is made up of about three parts by volume of xylol to one part by volume of carbon tetrachloride and the amount of the solvent mixture is such that each gallon of the resulting solution contains about two and three-quarters ounces of the other ingredients; that is, so that each gallon of the solution contains about one ounce of paraffin, about one-half ounce of coumarin resin, about one-quarter ounce of beeswax and about one ounce of aluminum palmitate.

The solution is stored and marketed in glass bottles or glass lined containers.

In compounding the ingredients of the composition the beeswax acts as a blending agent for the paraffin wax and the paracoumarin or other resin. Instead of using paracoumarin resin, other suitable resins such as dammar gum can be used, although I consider paracoumarin resin more advantageous.

The carbon tetrachloride is more volatile than the xylol, and, when the composition is used and the solvent is evaporated, the carbon tetrachloride, which is itself incombustible, serves to flame-proof the solvent vapors.

In using the new composition for the treatment of fabric, the fabric is thoroughly saturated with the composition and allowed to dry, with evaporation of the solvent. The fabric may be put through a wringer to remove the excess of the solution before drying. The composition can be applied by submerging the fabric or cloth in a bath of the composition, or the composition can be applied with a well saturated sponge.

In the manufacture of fabrics which are to be rendered waterproof and stainproof, the fabric can be passed through a bath of the composition, in a continuous manner, and then passed over a drying roll, or through a drying chamber, or permitted to dry by contact with the air; or the excess of the composition can be removed by passing the fabric through a wringer before drying.

The composition, when made of properly refined ingredients, is colorless, and, after the removal of the solvent, is odorless.

One of the problems presented in keeping fabrics and garments in a proper condition is the removal of stains of various kinds, which requires laundering or dry cleaning of the fabrics or garments. The treatment of the fabric or garment with the new composition not only waterproofs but stainproofs the same and preserves it, eliminating a large amount of the laundering or dry cleaning which would otherwise be necessary. The treated fabric or garment is thus rendered spot-proof against perspiration, alcoholic beverages, mud stains, tea, coffee, mildew, etc. Surface stains which do not penetrate the protected fabric or garment may be removed with a damp cloth. A single treatment will ordinarily be sufficient for the life of the cloth with ordinary wear, but where repeated laundering or dry cleaning leaves the fabric unprotected a further treatment may in time become necessary to insure continued protection.

The composition is well adapted for waterproofing and stainproofing dresses, hose, hats, ties, and other wearing apparel; window and shower curtains; heavy sport linens or delicate transparent velvets; felts, table linen, straw hats, canvas porch furniture, umbrellas, bathing suits, beach robes, automobile upholstery, etc.

I claim:

1. A waterproofing composition comprising the following ingredients in about the following proportions by weight:

| | Parts |
|---|---|
| Refined paraffin wax | 4 |
| Paracoumarin resin | 2 |
| White beeswax | 1 |
| Aluminum palmitate | 4 | said ingredients being blended together and dissolved in a composite solvent of xylol and carbon tetrachloride in the proportions of about three parts by volume of xylol to one part by volume of carbon tetrachloride, and the amount of solvent being such that about two and three-quarters ounces of the above composition is contained in each gallon of solution.

2. A waterproofing composition comprising the following ingredients in about the following proportions by weight:

| | Parts |
|---|---|
| Paraffin wax | 4 |
| Resin | 2 |
| Beeswax | 1 |
| Aluminum palmitate | 4 | said ingredients being blended together and dissolved in a composite solvent of xylol and carbon tetrachloride in which the carbon tetrachloride is present in an amount sufficient to flame-proof the solvent.

JOHN B. CLEAVELAND.